(12) United States Patent
Freund et al.

(10) Patent No.: US 6,559,625 B2
(45) Date of Patent: May 6, 2003

(54) CIRCUIT ARRANGEMENT AND ELECTRICAL APPLIANCE WITH AN INDUCTIVE LOAD AND A BUCK CONVERTER

(75) Inventors: Dirk Freund, Kelkheim (DE); Martin Giersiepen, Oberursel (DE); Brigitte Harttmann, Niedernhausen (DE); Ulrich Heck, Oberursel (DE); Stefan Hollinger, Kronberg (DE); Frank Kressmann, Schwalbach (DE); Gerrit Rönneberg, Darmstadt (DE); Fred Schnak, Kronberg (DE); Dieter Wunder, Schotten (DE)

(73) Assignee: Braun GmbH (DE)

( * ) Notice: Subject to any disclaimer, the term of this patent is extended or adjusted under 35 U.S.C. 154(b) by 0 days.

(21) Appl. No.: 09/928,802

(22) Filed: Aug. 13, 2001

(65) Prior Publication Data

US 2002/0021115 A1 Feb. 21, 2002

(30) Foreign Application Priority Data

Aug. 14, 2000 (DE) .......................... 100 40 275

(51) Int. Cl.$^7$ .............................. G05F 1/10; G05F 1/40; G05F 1/455

(52) U.S. Cl. .................. 323/282; 323/242; 323/222
(58) Field of Search ................. 323/301, 266, 323/282, 299, 242, 222

(56) References Cited

U.S. PATENT DOCUMENTS

| 4,276,588 A | * | 6/1981 | McLyman et al. ............. 363/56 |
| 5,377,094 A | | 12/1994 | Chang et al. ................ 363/132 |
| 5,894,243 A | * | 4/1999 | Hwang ........................ 327/540 |
| 6,016,041 A | * | 1/2000 | Weinmann ................... 318/245 |
| 6,069,810 A | | 5/2000 | Nachbaur et al. ........... 363/132 |
| 6,194,682 B1 | * | 2/2001 | Schneider et al. ...... 219/215.55 |

FOREIGN PATENT DOCUMENTS

| DE | 3826087 A1 | 2/1990 | |
| DE | 4237843 A1 | 5/1994 | |
| FR | 2 743 220 A | 7/1997 | .......... H02M/3/335 |
| JP | 60-22466 | 2/1985 | |
| JP | 62-171465 | 7/1987 | |
| JP | 63-171160 | 7/1988 | |

* cited by examiner

Primary Examiner—Bao Q. Vu
(74) Attorney, Agent, or Firm—Fish & Richardson PC

(57) ABSTRACT

The invention is directed to a circuit arrangement with an inductive load and a buck converter, wherein the inductive load serves as coil, as well as to an electrical appliance with such a circuit arrangement.

27 Claims, 1 Drawing Sheet

CIRCUIT ARRANGEMENT AND ELECTRICAL APPLIANCE WITH AN INDUCTIVE LOAD AND A BUCK CONVERTER

This invention relates to a circuit arrangement and an electrical appliance with a buck converter and an inductive load as, for example, an electric motor, a relay or a solenoid valve. A buck converter is known to include a diode, a coil and an electronic switching device switching the current passing through the coil on and off. The output voltage of the buck converter may be higher or lower than a supply voltage provided, for example, by a battery or a power supply.

BACKGROUND

The art knows of electrical appliances in which a buck converter produces from a supply voltage a dc voltage used for operating an electric motor. These appliances may additionally include an electronic circuit which is equally supplied by the buck converter.

Furthermore electrical appliances are known which have an electric motor adapted to have its speed regulated or to be switched on and off by an electronic circuit including, for example, a pulse duration modulator and an electronic switching device. In particular in battery powered electrical appliances of this type it may happen that when the electric motor is turned on the supply voltage drops at least temporarily to such a low level that proper operation of the electronic circuit is no longer ensured, causing, for example, a microcontroller to be reset.

From DE 42 37 843 a circuit arrangement for operating an inductive load is known which comprises at least one first and one second part winding. The circuit arrangement comprises a control arrangement and is operated from a dc voltage source whose voltage is not sufficient for operating the control arrangement. The part windings of the inductive load are utilized as autotransformer in order to thus generate a higher voltage sufficient to operate the control arrangement.

It is an object of the present invention to make sure that an electrical appliance with an inductive load and an electronic circuit functions reliably also under a fluctuating supply voltage, and to provide a circuit arrangement suitable therefor.

This object is accomplished in particularly simple manner by a circuit arrangement in which, according to the present invention, the buck converter utilizes the inductive load as coil. In an electrical appliance of the invention the buck converter supplies an electronic circuit but not the inductive load.

SUMMARY OF THE INVENTIONS

The present invention will be explained by way of an example in which the inductive load is an electric motor. In this instance the circuit arrangement of the invention has the particular advantage of requiring very few components in order to implement a speed regulation for the electric motor on the one hand, and a buck converter for stabilizing the supply voltage for an electronic circuit on the other hand. According to the invention not only is the electric motor used as coil for the buck converter, but also the electronic switching device used for speed regulation is utilized as switching device for the buck converter. To enable the buck converter to operate also when the electric motor is at a standstill, it is necessary to maintain a minimum current flow, chopped by the electronic switching device, through the electric motor, that is, the load needing to be powered by the electric motor has to be of a magnitude causing the electric motor to stop at this minimum current. On the other hand, care must be taken to ensure that the electric motor is not at any time operated at full power, that is, with the current not chopped, because otherwise the buck converter does not operate either. The permissible pulse duty factor of the chopped current to ensure satisfactory operation of the electrical appliance depends on the dimension of the electric motor, the dimension of a storage capacitor charged by the buck converter, and on the current consumption of the electronic circuit supplied by the storage capacitor. The pulse duty factor may be in the range of, for example, 0.01 to 100, and where small electrical appliance are concerned rather in the range of 0.05 to 20 or 0.1 to 10.

The present invention will be explained in the following with reference to the two embodiments for circuit arrangements illustrated in the accompanying drawings. Further embodiments are dealt with in the description.

DETAILED DESCRIPTION

Figure 1:
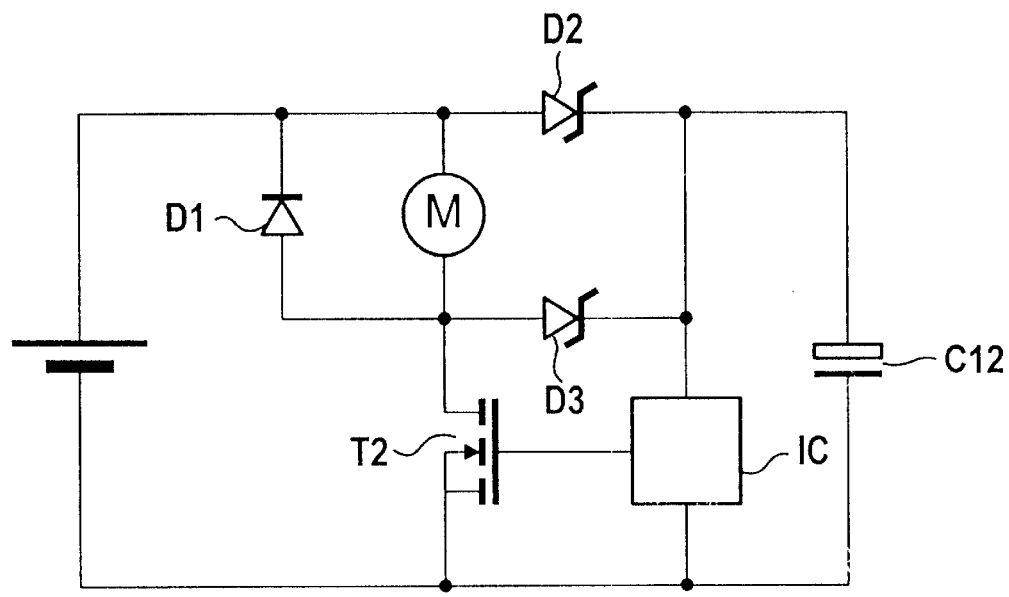
FIG. 1 is a diagram of a circuit in accordance with a first embodiment of the present invention.

The circuit arrangement of the present invention shown in FIG. 1 comprises a control circuit as, for example, a microcontroller IC, which is capable of driving a controllable switching device. The controllable switching device is comprised of a transistor T2 which, in series with an electric motor M, is connected to the terminals of a battery. Instead of a battery it is also possible to use a power supply as source of supply voltage. In parallel arrangement with the electric motor M is a first diode D1 which is reverse biased with respect to the battery voltage and acts as a freewheeling diode. A storage capacitor C12 has its one lead connected to the one battery terminal while its other lead is connected to the cathodes of two diodes D3, D2. The second diode D2 has its anode connected to the other battery terminal, and the third diode D3 has its anode connected to the junction of the motor M and the transistor T2. The second and third diodes D2, D3 are, for example, Schottky diodes whose conducting-state voltage is lower than the conducting-state voltage of the first diode D1. The microcontroller IC has its supply voltage leads in parallel arrangement with the storage capacitor C12.

The mode of operation of the circuit arrangement of the present invention will be described in the following, proceeding initially from the assumption that the third diode D 3 does not exist. The microcontroller IC comprises, for example, a pulse duration modulator driving the transistor T2, that is, turning it on and off. In consequence, a chopped direct current flows through the electric motor M, with the speed or the torque of the electric motor M being dependent on the pulse duty factor of the chopped direct current and the mechanical load to which the electric motor M is exposed. Whenever the transistor T2 is turned off, an induced voltage is produced on the electric motor M, which voltage is short-circuited via the first diode D1 provided it exceeds the conducting-state voltage of the first diode D1. The first diode D1 is preferably a silicon diode with a conducting-state voltage of 0.65 V. The battery charges the storage capacitor C12 via the second diode D2. The second diode D2 is preferably a Schottky diode with a conducting-state voltage of 0.2 V, for example. Therefore, the supply voltage of the microcontroller IC is invariably smaller than the battery voltage by 0.2 V. When the electric motor is exposed to high mechanical loads, the battery voltage and hence also the supply voltage of the microcontroller IC may drop to a level causing the microcontroller IC to execute a reset.

Considering now the presence of the third diode D3, it will be seen that the circuit arrangement of the invention comprises a buck converter made up of the microcontroller IC, the transistor T2, the electric motor M, the third diode D3 and the storage capacitor C12. The third diode D3 is preferably a Schottky diode whose conducting-state voltage is 0.2 V, for example. The buck converter is however in operation only when the pulse duty factor is neither zero nor infinite. The buck converter uses in a manner known in the art the induced voltage arising when the motor current is turned off in order to charge the storage capacitor C12 through the third diode D3 to a voltage level exceeding the battery voltage by no more than the difference of the conducting-state voltages of the first and third diodes. In the embodiment described in the foregoing, the supply voltage of the microcontroller IC hence exceeds the battery voltage by an amount of up to 0.45 V.

Figure 2:
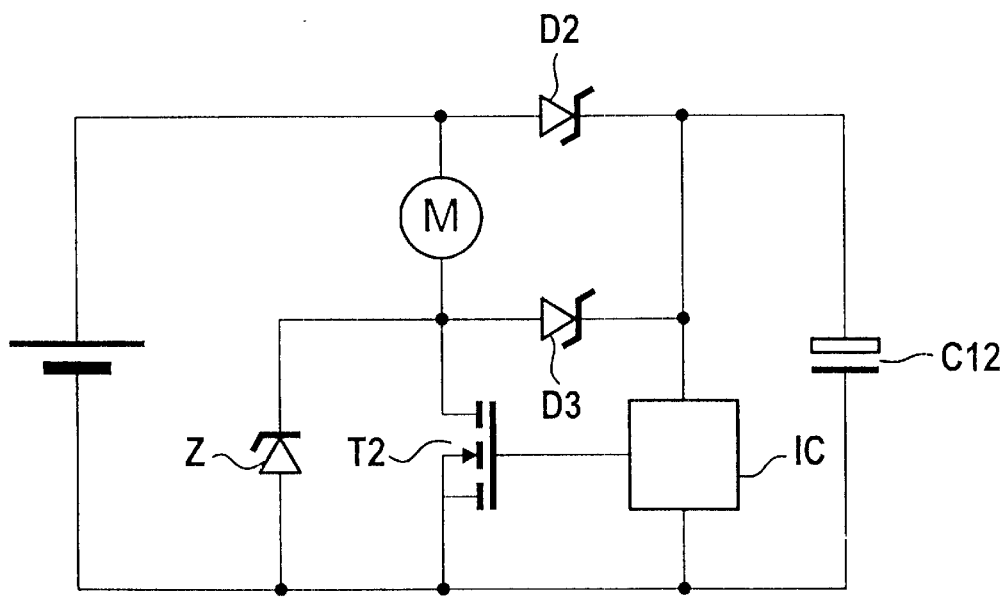
FIG. 2 is a diagram of a circuit in accordance with a second embodiment of the present invention.

The second circuit arrangement of the invention illustrated in FIG. 2 differs from the circuit arrangement of FIG. 1 only in the provision of a Zener diode Z instead of the freewheeling diode D1, which Zener diode is reverse biased with respect to the battery voltage, in parallel arrangement with the main conduction path of the transistor T2. This has the advantage chat the supply voltage generated by the buck converter may be significantly higher than the battery voltage because the voltage difference between the supply voltage and the battery voltage is no longer limited to the difference of the conducting-state voltages of the first and third diodes.

To enable the buck converter to be in operation as continuously as possible, the power of the electric motor M is adapted to the load to be driven by it, such that, for example, even with a pulse duty factor of between 0.05 and 0.1 the electric motor M cannot as yet rotate, that is, while the electric motor M is turned off mechanically, it already acts or continues acting electrically as a coil. On the other hand, even-under "full load" conditions the electric motor M is operated with a pulse duty factor of between 10 and 20 only, for example.

When the storage capacitor C12 is charged by the buck converter or by a power supply not shown in the Figures to a voltage level exceeding the battery voltage, it is also possible for the two most adverse operating conditions to be bypassed without the microcontroller IC executing a reset, that is, the turning on and off of the electric motor M "mechanically". At the instant the motor is turned on, that is, the pulse duty factor changes abruptly from a low value to a high value, the battery voltage may drop on account of the high power consumption of the electric motor M as it is starting up. At the instant the motor is turned off, that is, the pulse duty factor changes abruptly from a high value to a low value, the induced voltage of the electric motor M may be so high that the voltage across the anode of the third diode D3 is lower than the voltage across the anode of the second diode D2. Considering, however, that in the last mentioned case the voltage of the battery, from which the load is then removed, rises, it will be sufficient when the supply voltage of the microcontroller IC is maintained by the battery through the second diode D2.

In both circuit arrangements the second diode D2 may also be omitted, and/or the voltage across the capacitor C12 may be regulated through the pulse duty factor.

In particularly advantageous configurations for electrical appliances or circuit arrangements of the invention, the battery is rechargeable and can be charged, for example, by a power supply connected in parallel with the battery. The charging process can be controlled or regulated in a manner known in the art by an electronic switch which is connected in series with the power supply and the battery and is driven by a control or regulating circuit, in particular the microcontroller IC. The capacitor C12 can be likewise charged by the power supply via the second diode D2.

What is claimed is:

1. A buck converter for supplying voltage to an electronic circuit, the buck converter comprising:
    an inductive load provided by an electric motor;
    an electronic switching device connected in series with the inductive load; and
    a charge storage device in parallel with the electric motor and the electronic switching device, the charge storage device being charged via the inductive load, the electronic switching device controlling charging of the charge storage device by controlling a pulse duty cycle of current through the inductive load.

2. The buck converter of claim 1, wherein the inductive load serves as a coil to the buck converter.

3. The buck converter of claim 1 or 2, further comprising a control circuit to drive the electronic switching device.

4. The buck converter of claim 3, wherein the control circuit is adapted to be supplied with voltage from the charge storage device.

5. The buck converter of claim 3, wherein the electronic switching device is adapted to be turned on and off by the control circuit to thereby control the pulse duty cycle of current through the inductive load, wherein a ratio of turn-on duration to turn-off duration for the electronic switching device is within a range of 0.05 and 20.

6. The buck converter of claim 1, further comprising:
    a charging diode, through which the inductive load charges the charge storage device.

7. The buck converter of claim 6, wherein the charging diode is a Schottky diode.

8. The buck converter of claim 6, wherein the charging diode is connected in series with the inductive load.

9. The buck converter of claim 6, further comprising:
    a freewheeling diode connected to the inductive load to short-circuit induced voltage in the inductive load.

10. The buck converter of claim 9, wherein the inductive load charges the charge storage device to a voltage level that exceeds a battery voltage applied to the inductive load by no more than a difference of conducting state voltages of the charging diode and the freewheeling diode.

11. The buck converter of claim 6, further comprising:
    a zener diode in parallel with the electronic switching device.

12. The buck converter of claim 1, wherein the charge storage device comprises a capacitor.

13. An electrical appliance comprising:
    an electronic circuit; and
    a buck converter, the buck converter comprising:
        an inductive load provided by an electric motor;
        an electronic switching device connected in series with the inductive load; and
        a charge storage device in parallel with the electronic circuit, the charge storage device being charged via the inductive load, the electronic circuit controlling charging of the charge storage device by controlling the electronic switching device, the charge storage device supplying voltage to the electronic circuit.

14. The buck converter of claim 13, wherein the electronic switching device turns on and off to control the pulse duty cycle of current through the inductive load.

15. The buck converter of claim 13, wherein the inductive load serves as a coil to the buck converter.

16. The buck converter of claim 14, wherein the electronic switching device is adapted to be turned on and off by the electronic circuit to thereby control a pulse duty cycle of current through the inductive load, wherein a ratio of turn-on duration to turn-off duration for the electronic switching device is within a range of 0.05 and 20.

17. The buck converter of claim 13, further comprising:
a charging diode, through which the inductive load charges the charge storage device.

18. The buck converter of claim 17, wherein the charging diode is a Schottky diode.

19. The buck converter of claim 17 or 18, wherein the charging diode is connected in series with the inductive load.

20. The buck converter of claim 17, further comprising:
a freewheeling diode connected to the inductive load to short-circuit induced voltage in the inductive load.

21. The buck converter of claim 20, wherein the inductive load charges the charge storage device to a voltage level that exceeds a battery voltage applied to the inductive load by no more than a difference of conducting state voltages of the charging diode and the freewheeling diode.

22. The buck converter of claim 13, further comprising:
a zener diode in parallel with the electronic switching device.

23. The buck converter of claim 13, wherein the charge storage device comprises a capacitor.

24. The buck converter of claim 13, wherein the charge storage device does not supply voltage to the inductive load.

25. A buck converter circuit comprising:
an inductive load provided by an electric motor, the inductive load serving as a coil to the buck converter circuit; and
a charge storage device in parallel with the electric motor to provide power to an electronic circuit, the charge storage device being charged via the inductive load, wherein charging of the charge storage device is controlled by controlling a pulse duty cycle of current through the inductive load.

26. The buck converter circuit of claim 25, further comprising:
a charging diode, through which the inductive load charges the charge storage device.

27. The buck converter circuit of claim 25, further comprising:
a freewheeling diode connected to the inductive load to short-circuit induced voltage in the inductive load,
wherein the inductive load charges the charge storage device to a voltage level that exceeds a battery voltage applied to the inductive load by no more than a difference of conducting state voltages of the charging diode and the freewheeling diode.

* * * * *